(12) United States Patent
Reddy et al.

(10) Patent No.: US 12,547,783 B2
(45) Date of Patent: Feb. 10, 2026

(54) PRIVACY THREAT DETECTION WITH EXTENDED FIELD OF VIEW

(71) Applicant: DELL PRODUCTS L.P., Round Rock, TX (US)

(72) Inventors: Karunakar Palicherla Reddy, Austin, TX (US); Howard Yh Huang, TPQ (TW); Yung Sheng Lin, TPE (TW)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/537,964

(22) Filed: Dec. 13, 2023

(65) Prior Publication Data

US 2025/0200229 A1   Jun. 19, 2025

(51) Int. Cl.
| | |
|---|---|
| G06F 21/60 | (2013.01) |
| G06F 21/84 | (2013.01) |
| G06V 10/80 | (2022.01) |
| G06V 20/52 | (2022.01) |
| G06V 40/10 | (2022.01) |
| H04L 9/40  | (2022.01) |

(52) U.S. Cl.
CPC ............ G06F 21/84 (2013.01); G06F 21/604 (2013.01); G06V 10/80 (2022.01); G06V 20/52 (2022.01); G06V 40/10 (2022.01); H04L 63/105 (2013.01)

(58) Field of Classification Search
CPC ....... G06F 21/84; G06F 21/604; G06V 10/80; G06V 20/52; G06V 40/10; H04L 63/105
See application file for complete search history.

(56) References Cited

U.S. PATENT DOCUMENTS

| | | | |
|---|---|---|---|
| 10,259,427 B1 * | 4/2019  | Kearney ............... B60R 25/10 |
| 10,391,636 B2   | 8/2019  | Breazeal |
| 10,565,802 B2   | 2/2020  | Grossmann et al. |
| 10,757,323 B2   | 8/2020  | Alameh et al. |
| 11,487,353 B2   | 11/2022 | Harvey et al. |
| 11,797,105 B2   | 10/2023 | Schliemann et al. |
| 2014/0201844 A1 * | 7/2014  | Buck .................... G06F 21/554 |
| | | | 726/26 |
| 2017/0206064 A1 | 7/2017  | Breazeal et al. |
| 2018/0181194 A1 | 6/2018  | Harvey et al. |
| 2019/0279642 A1 | 9/2019  | Shukla et al. |
| 2019/0371318 A1 | 12/2019 | Shukla |
| 2021/0039591 A1 * | 2/2021  | Moeller ............... B60R 25/102 |
| 2021/0192188 A1 | 6/2021  | McCombe et al. |
| 2023/0376582 A1 | 11/2023 | Magi et al. |
| 2024/0340543 A1 * | 10/2024 | Yang .................... G06V 20/59 |

* cited by examiner

*Primary Examiner* — Amie C. Lin
(74) *Attorney, Agent, or Firm* — Jackson Walker L.L.P.

(57) ABSTRACT

Techniques for identifying potential privacy threats are described. One example method includes receiving a first set of signals from a first sensor representing information captured from an environment of the computer system in a first field of view associated with the first sensor; receiving a second set of signals from at least one second sensor representing information captured from an environment of the computer system in a second field of view associated with the second sensor, wherein the first sensor and the second sensor are of different types and the second field of view is wider than the first field of view; processing the first and second set of signals to create a representation of an effective field of view that is wider than the first field of view; and detecting the presence of at least one person within the effective field of view based on the representation.

14 Claims, 4 Drawing Sheets

PRIVACY THREAT DETECTION WITH EXTENDED FIELD OF VIEW

TECHNICAL FIELD

The present disclosure relates in general information handling particularly to techniques for detecting privacy threats in information handling systems.

BACKGROUND OF THE INVENTION

Many computer systems can detect the physical presence of a user near the system. This ability to detect user presence can allow the system to be contextually aware of user's proximity to the system, the user's attention to the system, the environment in which the user is using the system, and other information. For example, a system can automatically wake up from a low power state in response to detecting the presence of a user, and can initiate facial recognition to verify the user's identity to quickly log them into the system. A system can also lock itself when it detects that no user is present. User presence can be detected, for example, by analyzing captured video signals from a low power camera device, audio signals from a microphone, or other signals or combinations of signals.

SUMMARY OF THE INVENTION

In accordance with embodiments of the present disclosure, a method for privacy threat detection with an extended field of view is described in which a first set of signals is received from a first sensor, the first set of signals representing information captured from an environment of the computer system in a first field of view associated with the first sensor. A second set of signals is received from at least one second sensor, the second set of signals representing information captured from an environment of the computer system in a second field of view associated with the second sensor, wherein the first sensor and the second sensor are of different types and the second field of view is wider than the first field of view. The first and second set of signals are processed to create a representation of an effective field of view that is wider than the first field of view. The presence of at least one person is detected within the effective field of view based on the representation.

In some cases, the first sensor is a camera.

In some implementations, the second sensor includes one or more of an ultrasound sensor, a WiFi Doppler sensor, an ultra wideband (UWB) sensor, or a radio frequency (RF) radar sensor.

In some cases, in response to detecting the presence of the person within the effective field of view based on the representation, it is determined that the person is an authorized user based on the first set of signals, and in response to determining that the person is a registered user, the computer system is operated at a normal security level.

In some implementations, in response to detecting the presence of the person within the effective field of view based on the representation, it is determined that the person is either not an authenticated user or is of unknown authentication status based on the first set of signals, and in response to determining, the computer system is operated at a heightened security level including one or more security restrictions not included in a normal security level.

In some cases, operating the computer system at a heightened security level includes notifying an authenticated user of the computer system of the presence of the detected person.

In some cases, operating the computer system at a heightened security level includes obfuscating portions of a display of the computer system that can be seen by the detected person based on the first and second sets of signals.

In accordance with embodiments of the present disclosure, a system for privacy threat detection with an extended field of view is described that performs operations in which a first set of signals is received from a first sensor, the first set of signals representing information captured from an environment of the computer system in a first field of view associated with the first sensor. A second set of signals is received from at least one second sensor, the second set of signals representing information captured from an environment of the computer system in a second field of view associated with the second sensor, wherein the first sensor and the second sensor are of different types and the second field of view is wider than the first field of view. The first and second set of signals are processed to create a representation of an effective field of view that is wider than the first field of view. The presence of at least one person is detected within the effective field of view based on the representation.

In accordance with embodiments of the present disclosure, an article of manufacture includes a non-transitory, computer-readable medium having computer-executable instructions thereon that are executable by a processor of a computer system to perform operations for privacy threat detection with an extended field of view in which a first set of signals is received from a first sensor, the first set of signals representing information captured from an environment of the computer system in a first field of view associated with the first sensor. A second set of signals is received from at least one second sensor, the second set of signals representing information captured from an environment of the computer system in a second field of view associated with the second sensor, wherein the first sensor and the second sensor are of different types and the second field of view is wider than the first field of view. The first and second set of signals are processed to create a representation of an effective field of view that is wider than the first field of view. The presence of at least one person is detected within the effective field of view based on the representation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE SEVERAL VIEWS OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Existing user presence and attention sensing implementations in PC and peripherals implementations have issues with limited field of view with usage of vision-based sensing modality. Standard fields of view for cameras in clamshell system cases are approximately 78 to 80 degrees. Standard peripheral USB cameras can be in the range of 110 degrees. The problem is contextual privacy features such as onlooker detection have "occlusions," or field of view blindness when implemented in vision-based systems today.

For solutions that are required to sense persons in the wider periphery of a display screen of a computer system (angles from which displayed information is still viewable on modern displays), standard user presence are not able to eliminate the need for screen filters or electronic privacy hardware solutions, which impact the displayed image quality and are expensive, respectively.

There are other non-attention, purely proximity-based modalities that have a wider field of view than vision-based sensing modalities. However, the lack of attention sensing capability, and lack of clear multi-user distinction, makes such proximity modalities unsuitable as a primary modality. Thus, there is a need to have a wider field of view comprehensive solution that intelligently is able to orchestra when to use the mix of proximity sensing, as well as attention sensing to make an informed decision of impacting screen context privacy. The present disclosure describes techniques for providing a fusion of multiple sensor modalities to extend the effective field of view of a system, thereby enabling a greater range of privacy threats to be detected and mitigated.

Preferred embodiments and their advantages are best understood by reference to FIGS. 1 through 4, wherein like numbers are used to indicate like and corresponding parts.

Figure 1:
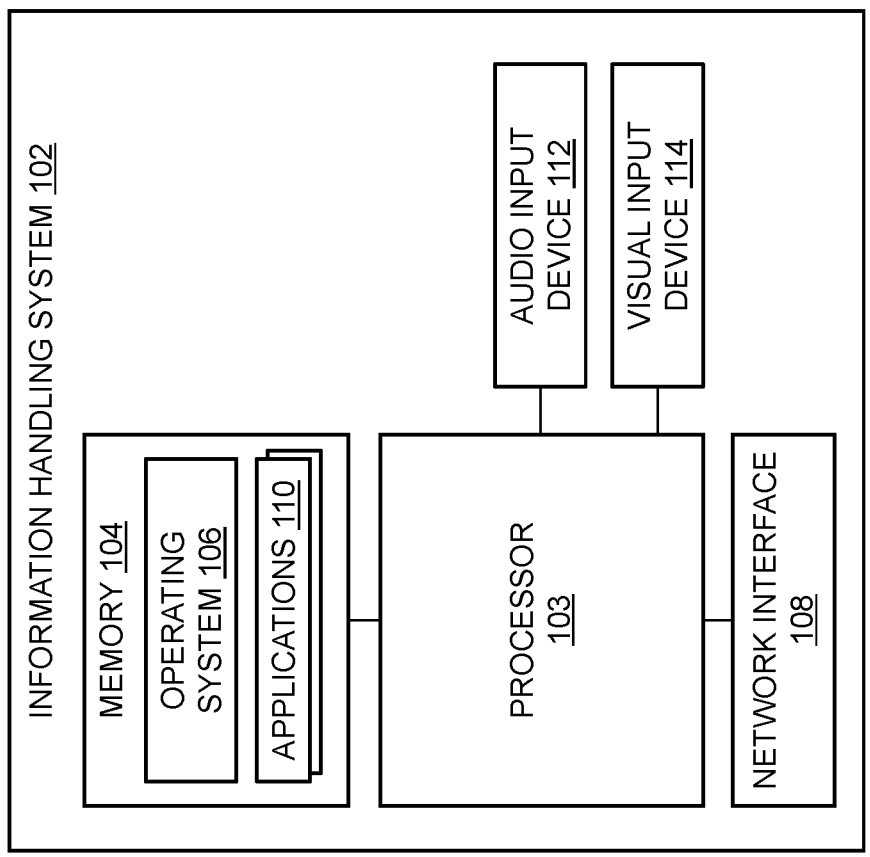
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, and a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Memory 104 may also have stored thereon one or more applications 110. Each of the applications 110 may comprise any program of executable instructions (or aggregation of programs of executable instructions) configured to make use of the hardware resources of the information handling system 102, such as memory, processor time, disk space, input and output devices (e.g., 112, 114), and the like. In some implementations, the applications 110 may interact with the operating system 106 to make of the hardware resources, and the operating system 106 may manage and control the access of the applications 110 to these resources (as described above).

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In some embodiments, information handling system 102 may include more than one processor 103. For example, one such processor 103 may be a CPU, and other processors 103 may include various other processing cores such as application processing units (APUs) and graphics processing units (GPUS).

Information handling system 102 further includes an audio input device 112 communicatively coupled to processor 103. Audio input device 112 can be any device (e.g., a microphone) operable to detect audible signals (i.e., sound waves) in the environment external to the information handling system 102, and convert those audible signals into electrical signals. These electrical signals representing the detected audible signals can be provided to the processor 103 where they can be analyzed and interpreted, for example at the direction of applications 110 and/or operating system 106. In some cases, the audio input device 112 integrated into the information handling system 102, such as in the case of a built-in microphone. The audio input device 112 may also be an external device communicatively coupled to the information handling system 102, such as an external microphone connected via Universal Serial Bus (USB).

Information handling system 102 further includes an visual input device 114 communicatively coupled to processor 103. Visual input device 114 can be any device operable to detect electromagnetic radiation, such as visible light, and convert it into representative electrical signals. These electrical signals representing the detected electromagnetic radiation can be provided to the processor 103 where they can be analyzed and interpreted, for example at the direction of applications 110 and/or operating system 106. In some cases, the visual input device 114 can be complementary metal-oxide-semiconductor (CMOS) sensor, a charge coupled device (CCD) sensor, or another type of sensor operable to detect electromagnetic radiation. In some implementations, the visual input device 114 may be configured to detect a particular range of wavelengths of electromagnetic radiation, such as the visual light range, the ultraviolet range, the infrared range, or combinations of these and other ranges. In some cases, the visual input device 114 may be a low power camera device that monitors the environment while the information handling system 102 remains in a lower power state. In some implementations, the visual input device 114 can be integrated into the information handling system 102, such as in the case of a built-in camera. The visual input device 114 may also be an external device communicatively coupled to the information handling system 102, such as an external camera connected via USB.

Figure 2:
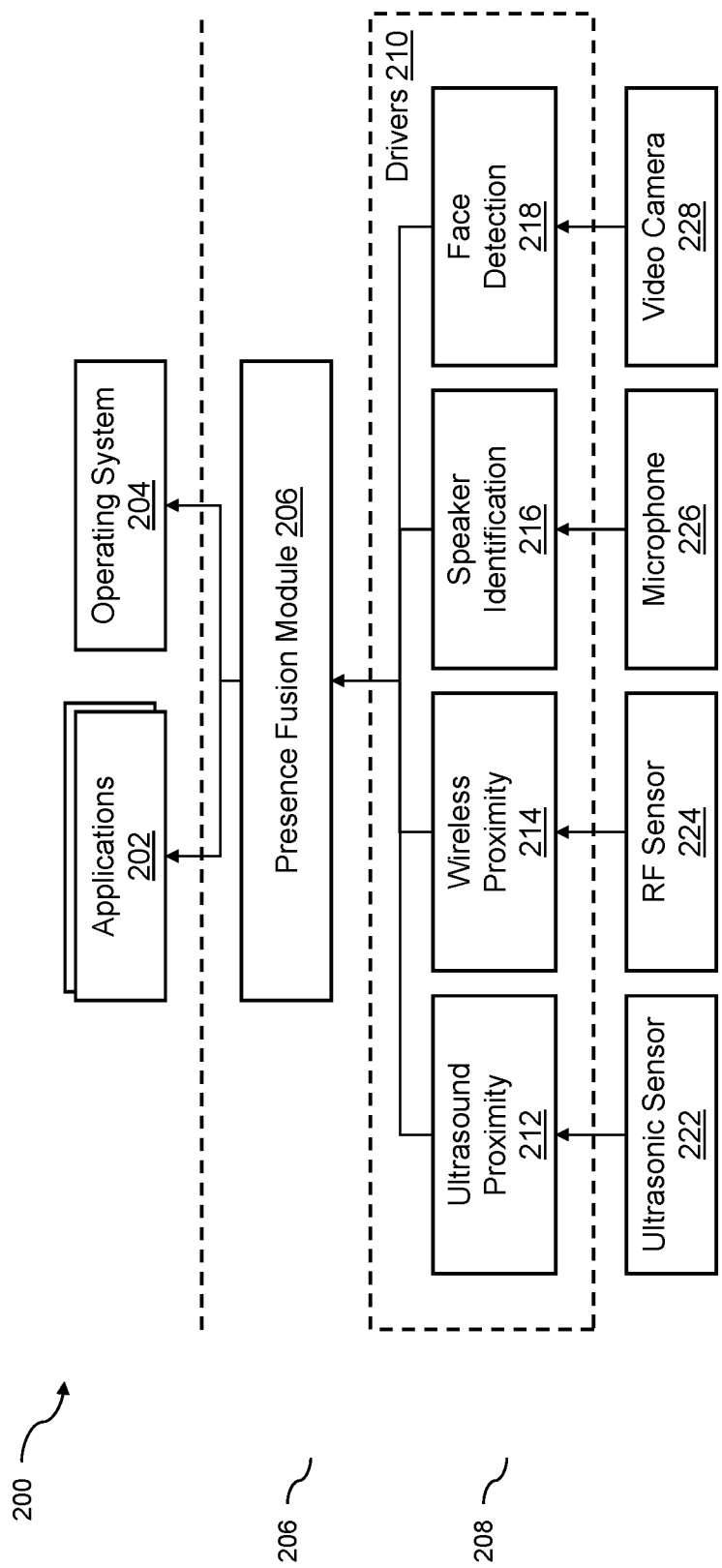
FIG. 2 illustrates a block diagram of example components of a system for identifying potential privacy threats, in accordance with embodiments of the present disclosure.

FIG. 2 illustrates a block diagram of example components of a system 200 for identifying potential privacy threats, in accordance with embodiments of the present disclosure. In some cases, the system 200 may be part of a computer system, such as information handling system 102.

As shown, the system 200 includes applications 202 and operating system 204 communicatively coupled to presence fusion module 206, which is communicatively coupled a set of drivers 210. The set of drivers 210 includes ultrasound proximity driver 212, wireless proximity driver 214, speaker identification module 216, and face detection module 218. The system 200 further includes various sensors, including ultrasonic sensor 222, radio frequency (RF) sensor 224, microphone 226, and camera 228, each communicatively coupled to one or more of the set of drivers 210.

In operation, the signals from the sensors 222, 224, 226, and 228 are received by the drivers 212, 214, 216, 218, and analyzed by the particular driver. For example, the ultrasound proximity driver 212 may analyze signals from the ultrasonic sensor 222 to determine whether the signals indicate the presence of a person in the vicinity of the system. Wireless proximity driver 214 may analyze reflections of previous emitted RF signals in an RF radar scheme to determine the presence of a person in the vicinity of the system. Speaker identification module 216 may analyze audio signals captured by the microphone 226 and identify a number of speakers in the vicinity of the system. Face detection module 218 may analyze captured video signals from the video camera 228 to identify human faces, which indicate the presence of a person proximate to the system.

The drivers 210 communicate with the presence fusion module 206. In operation, the presence fusion module 206 receives the indications from the different drivers regarding proximity/presence detected the different sensor using modalities. The presence fusion module 206 may provide a unified representation of the proximity/presence of persons to the system to the applications 202 and the operating system 204. For example, for certain sensor modalities, such as video, the presence fusion module 206 will assign high confidence to an indication of proximity/presence, since the detection of human features such as faces are highly indicative of the actual presence of a person in the field of view of the video camera 228. For other sensor modalities, such as ultrasound or RF radar, the presence fusion module 206 may assign a lower confidence, since it may be difficult to determine whether a detected object is a human. In some cases, the presence fusion module 206 may treat repeated indications from these drivers, especially ones indicating that a detected object is moving, with higher confidence. In some implementations, the presence fusion module 206 may utilize a machine learning model trained to identify the presence of humans based on multi-modal sensor data. In such a case, the drivers 210 may simply pass through the raw data from the sensors for analysis by the model.

Figure 3:
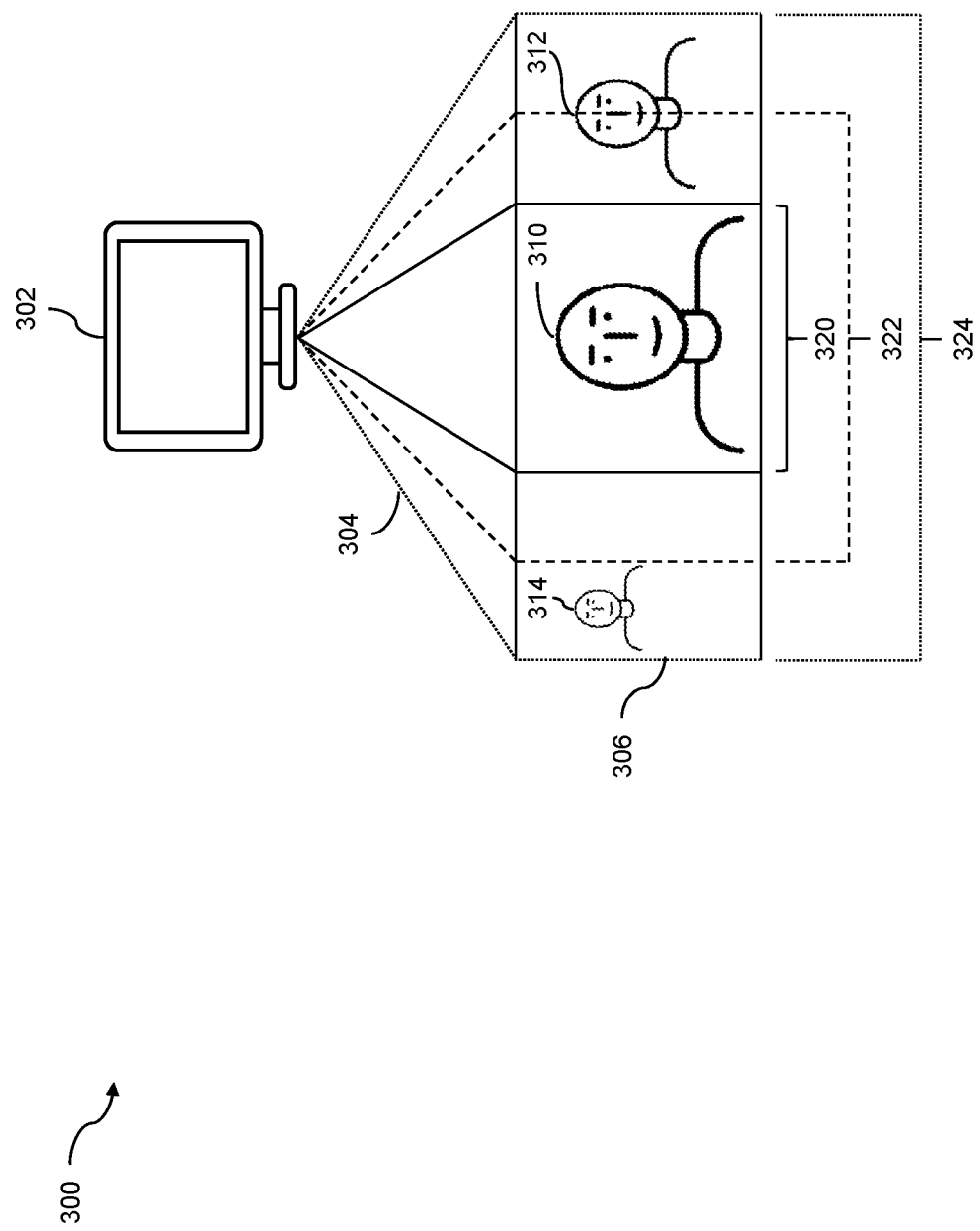
FIG. 3 illustrates a block diagram of an example system for identifying potential privacy threats, in accordance with embodiments of the present disclosure.

FIG. 3 illustrates a block diagram of an example system 300 for identifying potential privacy threats, in accordance with embodiments of the present disclosure. The system 300 includes a computer system 302, which may include, for example, the information handling system 102, the system 200, or a combination of the two.

The computer system 302 includes multiple sensors (not shown) which a field of view 304 of the environment around the computer system 302. The field of view 304 is a composite of three component fields of view 320, 322, and 324 representing the contribution of different sensor modalities to the overall field of view 304 of the computer system 302.

This illustrates a benefit of the extended field of view provided by embodiments of the present disclosure. As shown, a scene 306 is present in the field of view 304. The scene 306 includes three persons 310, 312, 314. In the most narrow component field of view 320, only person 310 is present. This component field of view 320 may represent a video sensor, which generally has a more narrow field of view than other modalities such as RF radar or ultrasound. If the computer system 302 only utilized the particular sensor associated with component field of view 320, it would not detect persons 312, 314, who may nonetheless be able to easily view a display of the computer system 302 and thus represent a potential privacy threat. In some cases, the computer system 302 may obfuscating portions of the display that can be seen by the detected person, such as by "texturizing" the displayed content by displaying a overlaying pattern, thereby making the content more difficult to view at a distance.

The second component field of view 322 is wider than view 320. This component field of view 320 may represent a sensor with a wider field of view than a video sensor, such as RF radar, ultrasound, wireless Doppler, or other types of sensors. As shown, person 312 is within the component field of view 322, but not within component field of view 320. Thus, the extended field of view enables additional potential privacy threats to be identified.

The third component field of view 322 is wider than views 320, 322. This component field of view 320 may represent a sensor with a wider field of view than a video sensor, such as RF radar, ultrasound, wireless Doppler, or other types of sensors. As shown, person 314 is within the component field of view 324, but not within component fields of view 320, 322. Thus, the extended field of view enables additional potential privacy threats to be identified.

Figure 4:
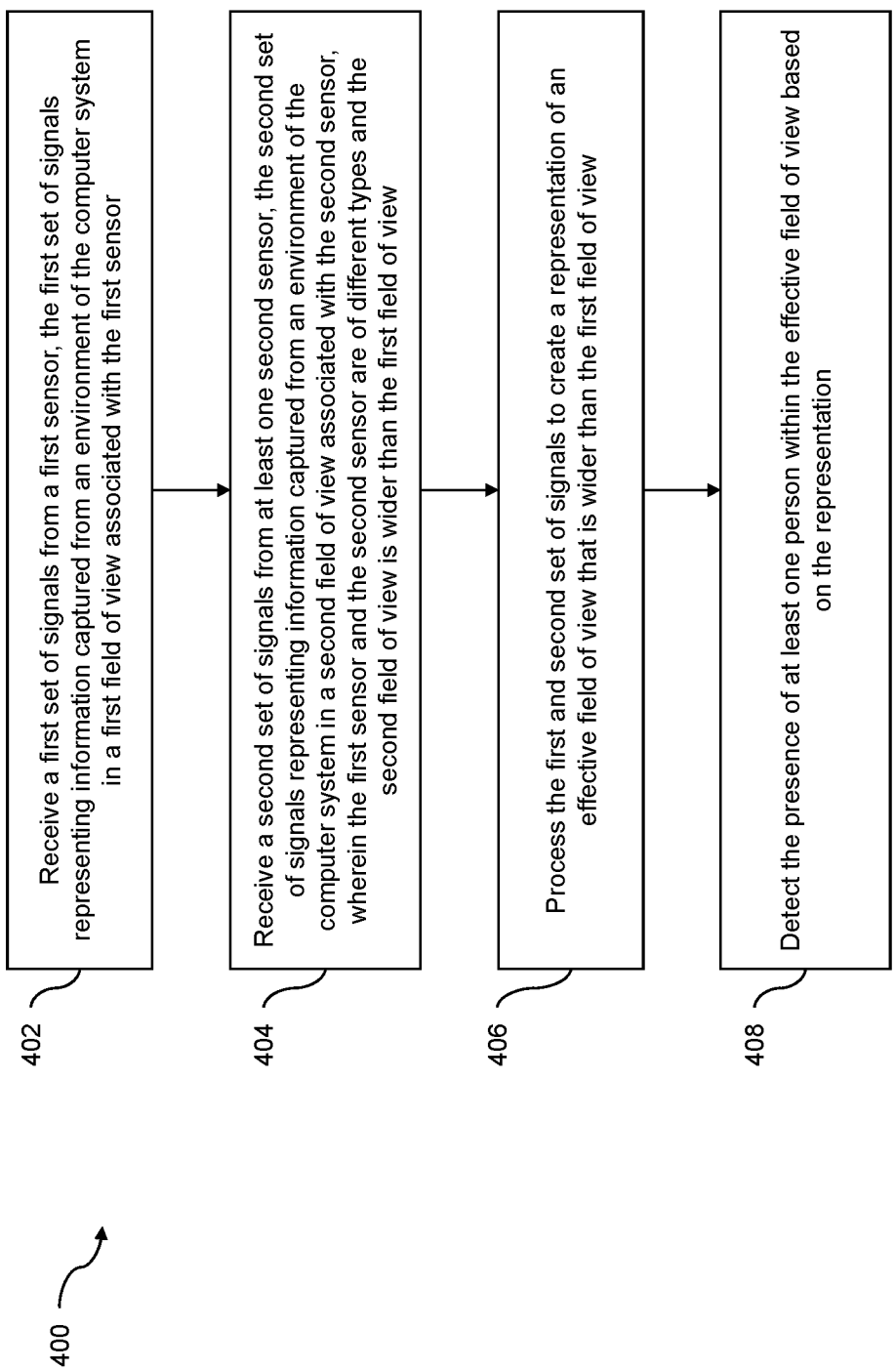
FIG. 4 illustrates a flow chart of an example process for identifying potential privacy threats, in accordance with embodiments of the present disclosure.

FIG. 4 illustrates a flow chart of an example process 400 for identifying potential privacy threats, in accordance with embodiments of the present disclosure.

At 402, a first set of signals is received from a first sensor, the first set of signals representing information captured from an environment of the computer system in a first field of view associated with the first sensor.

At 404, a second set of signals is received from at least one second sensor, the second set of signals representing information captured from an environment of the computer system in a second field of view associated with the second sensor, wherein the first sensor and the second sensor are of different types and the second field of view is wider than the first field of view.

At 406, the first and second set of signals are processed to create a representation of an effective field of view that is wider than the first field of view.

At 408, the presence of at least one person is detected within the effective field of view based on the representation.

In some cases, the first sensor is a camera.

In some implementations, the second sensor includes one or more of an ultrasound sensor, a WiFi Doppler sensor, an ultra wideband (UWB) sensor, or a radio frequency (RF) radar sensor.

In some cases, in response to detecting the presence of the person within the effective field of view based on the representation, it is determined that the person is an authorized user based on the first set of signals, and in response to determining that the person is a registered user, the computer system is operated at a normal security level.

In some implementations, in response to detecting the presence of the person within the effective field of view based on the representation, it is determined that the person is either not an authenticated user or is of unknown authentication status based on the first set of signals, and in response to determining, the computer system is operated at a heightened security level including one or more security restrictions not included in a normal security level.

In some cases, operating the computer system at a heightened security level includes notifying an authenticated user of the computer system of the presence of the detected person.

In some cases, operating the computer system at a heightened security level includes obfuscating portions of a display of the computer system that can be seen by the detected person based on the first and second sets of signals.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim for [performing elements using the "means a function]" construct.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "couple-able" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:
   receiving, by a computer system having at least one processor, a first set of signals from a first sensor, the first set of signals representing information captured from an environment of the computer system in a first field of view associated with the first sensor, wherein the first sensor is a video camera;
   receiving, by the computer system, a second set of signals from at least one second sensor, the second set of signals representing information captured from an environment of the computer system in a second field of view associated with the second sensor, wherein the second field of view is wider than the first field of view, and wherein the second sensor is a radio frequency (RF) radar sensor;
   receiving, by the computer system a third set of signals from at least one third sensor, the third set of signals representing information captured from an environment of the computer system in a third field of view associated with the third sensor, wherein the third field of view is wider than the second field of view, and wherein the third sensor is an ultrasound sensor;
   processing, by the computer system, the first, second, and third sets of signals to create a representation of an effective field of view that is wider than the first field of view and the second field of view; and
   detecting, by the computer system, the presence of at least one person within the effective field of view based on the representation.

2. The method of claim 1, further comprising:
   in response to detecting the presence of the person within the effective field of view based on the representation, determining that the person is an authorized user based on the first set of signals; and
   in response to determining that the person is a registered user, operating the computer system at a normal security level.

3. The method of claim 1, further comprising:
   in response to detecting the presence of the person within the effective field of view based on the representation, determining that the person is either not an authenticated user or is of unknown authentication status based on the first set of signals; and
   in response to determining, operating the computer system at a heightened security level including one or more security restrictions not included in a normal security level.

4. The method of claim 3, wherein operating the computer system at a heightened security level includes notifying an authenticated user of the computer system of the presence of the detected person.

5. The method of claim 3, wherein operating the computer system at a heightened security level includes obfuscating portions of a display of the computer system that can be seen by the detected person based on the first, second, and third sets of signals.

6. A system comprising:
   a computer system including at least one processor and a memory, and configured to perform operations including:
      receiving, by a computer system having at least one processor, a first set of signals from a first sensor, the first set of signals representing information captured from an environment of the computer system in a first field of view associated with the first sensor, wherein the first sensor is a video camera;
      receiving, by the computer system, a second set of signals from at least one second sensor, the second set of signals representing information captured from an environment of the computer system in a second field of view associated with the second sensor, wherein the second field of view is wider than the first field of view, and wherein the second sensor is a radio frequency (RF) radar sensor;
      receiving, by the computer system a third set of signals from at least one third sensor, the third set of signals representing information captured from an environment of the computer system in a third field of view associated with the third sensor, wherein the third field of view is wider than the second field of view, and wherein the third sensor is an ultrasound sensor;
      processing, by the computer system, the first, second, and third sets of signals to create a representation of an effective field of view that is wider than the first field of view and the second field of view; and
      detecting, by the computer system, the presence of at least one person within the effective field of view based on the representation.

7. The system of claim 6, the operations further comprising:
   in response to detecting the presence of the person within the effective field of view based on the representation, determining that the person is an authorized user based on the first set of signals; and
   in response to determining that the person is a registered user, operating the computer system at a normal security level.

8. The system of claim 6, the operations further comprising:
   in response to detecting the presence of the person within the effective field of view based on the representation, determining that the person is either not an authenticated user or is of unknown authentication status based on the first set of signals; and
   in response to determining, operating the computer system at a heightened security level including one or more security restrictions not included in a normal security level.

9. The system of claim 8, wherein operating the computer system at a heightened security level includes notifying an authenticated user of the computer system of the presence of the detected person.

10. The system of claim 8, wherein operating the computer system at a heightened security level includes obfuscating portions of a display of the computer system that can be seen by the detected person based on the first and second sets of signals.

11. An article of manufacture comprising a non-transitory, computer-readable medium having computer-executable instructions thereon that, when executed by a processor of a computer system, cause the processor to perform operations comprising:

receiving a first set of signals from a first sensor, the first set of signals representing information captured from an environment of the computer system in a first field of view associated with the first sensor, wherein the first sensor is a video camera;

receiving a second set of signals from at least one second sensor, the second set of signals representing information captured from an environment of the computer system in a second field of view associated with the second sensor, wherein the second field of view is wider than the first field of view, and wherein the second sensor is a radio frequency (RF) radar sensor;

receiving, by the computer system a third set of signals from at least one third sensor, the third set of signals representing information captured from an environment of the computer system in a third field of view associated with the third sensor, wherein the third field of view is wider than the second field of view, and wherein the third sensor is an ultrasound sensor;

processing the first, second, and third sets of signals to create a representation of an effective field of view that is wider than the first field of view and the second field of view; and detecting the presence of at least one person within the effective field of view based on the representation.

12. The article of claim 11, the operations further comprising:

in response to detecting the presence of the person within the effective field of view based on the representation, determining that the person is an authorized user based on the first set of signals; and in response to determining that the person is a registered user, operating the computer system at a normal security level.

13. The article of claim 11, the operations further comprising:

in response to detecting the presence of the person within the effective field of view based on the representation, determining that the person is either not an authenticated user or is of unknown authentication status based on the first set of signals; and in response to determining, operating the computer system at a heightened security level including one or more security restrictions not included in a normal security level.

14. The article of claim 13, wherein operating the computer system at a heightened security level includes notifying an authenticated user of the computer system of the presence of the detected person.

* * * * *